(12) United States Patent
Ward

(10) Patent No.: US 6,932,105 B1
(45) Date of Patent: Aug. 23, 2005

(54) ANTIFREEZING GUARD FOR PIPES

(76) Inventor: Gerald E. Ward, 91 S. Wellington, Runny Meade Estate, O'Fallon, MO (US) 63366

(*) Notice: Subject to any disclaimer, the term of this patent is extended or adjusted under 35 U.S.C. 154(b) by 105 days.

(21) Appl. No.: 10/411,936

(22) Filed: Apr. 11, 2003

(51) Int. Cl.⁷ ............................................. F16L 7/00
(52) U.S. Cl. .................. 137/338; 137/375; 138/149; 165/45; 285/47
(58) Field of Search ................. 137/375, 338; 138/149; 165/45; 285/47

(56) References Cited

U.S. PATENT DOCUMENTS

| | | | |
|---|---|---|---|
| 2,497,914 A * | 2/1950 | Sawyer | 249/179 |
| 2,595,408 A | 5/1952 | Quest | 405/40 |
| 3,044,915 A * | 7/1962 | Jacobsen | 137/375 |
| 3,148,699 A * | 9/1964 | Shindler | 137/312 |
| 3,304,005 A | 2/1967 | Lytle, Sr. et al. | 237/30 |
| 3,650,299 A * | 3/1972 | Seiler et al. | 138/149 |
| 3,777,501 A * | 12/1973 | Sharp et al. | 62/50.7 |
| 3,819,209 A | 6/1974 | Anderson et al. | 285/73 |
| 3,832,525 A | 8/1974 | Stanton et al. | 392/468 |
| 4,124,179 A | 11/1978 | Powell et al. | 237/28 |
| 4,649,324 A * | 3/1987 | Guerra et al. | 315/370 |
| 4,726,394 A * | 2/1988 | Devine | 137/341 |
| 4,735,235 A | 4/1988 | Anderson et al. | 138/109 |
| 5,025,836 A * | 6/1991 | Botsolas | 138/110 |
| 5,094,273 A | 3/1992 | Eagleton | 138/107 |
| 5,158,114 A * | 10/1992 | Botsolas | 138/149 |
| 5,219,403 A | 6/1993 | Murphy | 137/561 A |
| 5,524,669 A * | 6/1996 | Trueb et al. | 137/375 |
| 6,019,123 A * | 2/2000 | Gibbs | 137/338 |
| 6,206,030 B1 * | 3/2001 | Barthuly | 137/341 |
| 6,688,327 B1 * | 2/2004 | Baker | 137/375 |

* cited by examiner

*Primary Examiner*—A. Michael Chambers
(74) *Attorney, Agent, or Firm*—Grace J. Fishel

(57) ABSTRACT

A system and kit for forming an inexpensive protective plenum around pipes subject to freezing is disclosed. The system uses tubes formed of thin, flexible material, such as plastic tubes, to form the plenum. The plenum may be installed in sections with the sections joined with rings or collars at the joints. The rings and collars may also be formed of inexpensive materials, such as plastics. The tubes of the plenum may be formed from plastic sheets by joining the sheets at opposite edges to form seamed tubes. The edges may be joined by tapes or adhesives. The tubes may be formed around existing piping for ease of retrofit installation. The plenum may be connected to a source of hot air, such as the duct work of the hot air heating system of a dwelling.

19 Claims, 5 Drawing Sheets

ANTIFREEZING GUARD FOR PIPES

BACKGROUND OF THE INVENTION

1. Field of the Invention

The present invention relates to an antifreezing guard for pipes, such as water pipes. In particular, the invention relates to a guard for protecting exterior water pipes on a mobile home from freezing.

2. Brief Description of the Prior Art

It is known that water pipes in unheated spaces freeze in cold weather. For example, the water pipes in unheated crawl spaces under mobile homes are subject to freezing. Similarly, water pipes in under floor and attic crawl spaces of fixed dwellings are subject to freezing.

Water pipes in unheated spaces are typically wrapped with an electric heat tape in order to protect them from freezing. To extend the life of the heat tape, it is good practice to turn the heat tape off in the summer. With a mobile home, however, the heat tape is usually concealed under a skirt of the trailer and no thought is given to the heat tape until a pipe freezes because the heat tape has burned out. With respect to mobile homes, other devices, such as rigid plenums tapped into a heating duct of a forced air furnace have been suggested for use in keeping water pipes from freezing.

U.S. Pat. Nos. 2,595,408, 3,304,005, 3,819,209, 3,832,525, 4,124,179, 4,735,235, 5,094,273, 5,219,403, 6,019,123, and 6,206,030 are incorporated by reference herein.

BRIEF SUMMARY OF THE INVENTION

The present invention provides an inexpensive antifreezing guard, which can be provided in kit form, for forming a protective plenum around pipes subject to freezing. The present invention also provides a method of forming such a plenum. The kit and plenum of the invention is preferably formed of inexpensive materials, such as flexible, thin polymer sheeting. The polymer sheeting may be installed as tubes surrounding the pipes being protected. The tubes are supported by collars or rings provided at spaced intervals along the length of the tube. Straps may be provided for spacing the collars.

The plenum may be formed from sheet stock which is seamed into tubes at the place of manufacture or molded as a casing. Alternatively, the tubes may be formed at the place of installation. Premade tubes are best installed on pipes subject to freezing when the home is first placed on a site but for retrofitting existing structures, tubes formed at the place of installation may be easier to install.

The tubes may be formed from sheet stock at the place of installation by joining opposite edges of the sheet stock to form a tube. The opposite edges may be joined with an adhesive tape or by applying an adhesive layer at an edge of a sheet which may be overlapped with an opposite edge. Hook and pile fasteners, such as VELCRO brand tape, may be used in place of adhesive. The tape or adhesive may be applied at the place of installation of the plenum of the invention or at a separate location and protected by a strip sheet until the time of installation.

The tubes may be installed in sections and the sections intermediated by the collars or rings. The joined plenum is attached to a hot air source at the place of installation. The hot air loosely inflates the plenum and forms a warm air blanket around the protected pipes which protects the pipes against freezing.

In view of the above, it is an object of the present invention to provide an inexpensive protective plenum around pipes subject to freezing. It is another object to provide the plenum in kit form for installation on new or existing pipes. These and other objects of the invention will be apparent from the drawings and from the following description of the drawings and from the Description of the preferred embodiments, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
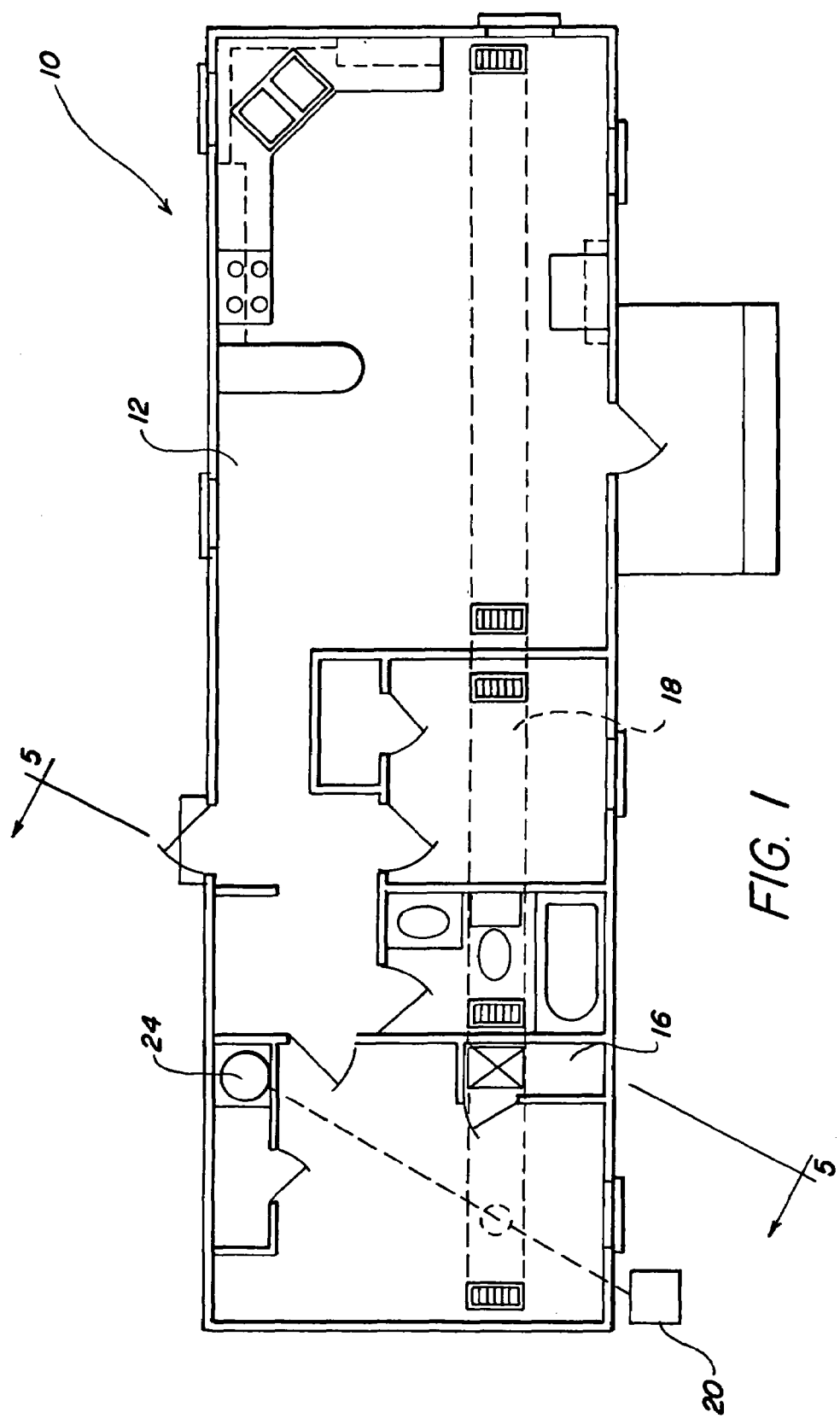
FIG. 1 is a top plan view, in schematic, of the floor layout of a typical mobile home.
Figure 2:
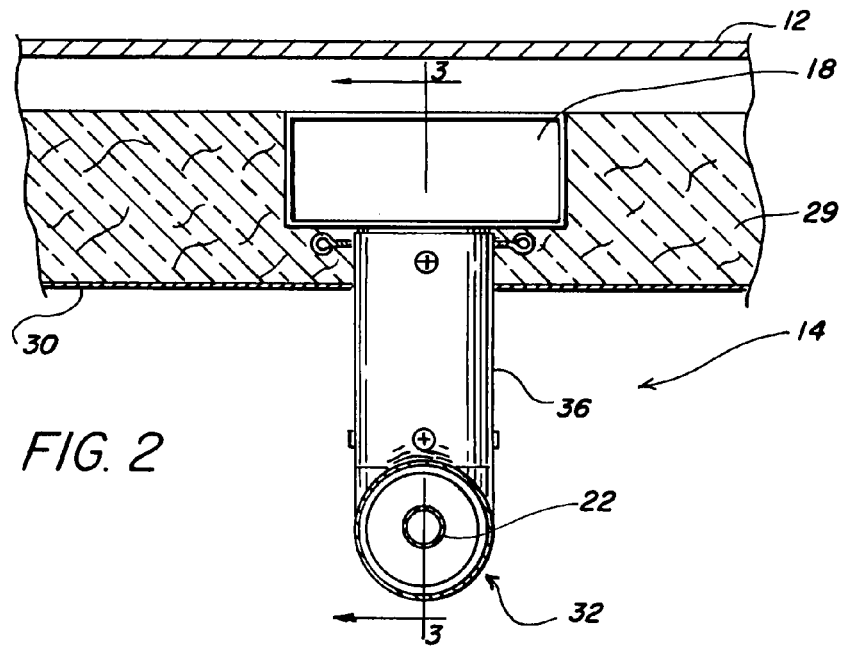
FIG. 2 is a partial cross-sectional view of the device of the invention installed on a water pipe in an unheated crawl space, such as under the mobile home of FIG. 1.

Referring to FIG. 1, a mobile home 10 is shown. Mobile home 10 has a floor 12 and an unheated crawl space 14 under floor 12, as shown in FIG. 2. Mobile home 12 has a forced hot air furnace 16 heating mobile home 10 through a duct work 18, shown in phantom in FIG. 1.

Figure 5:
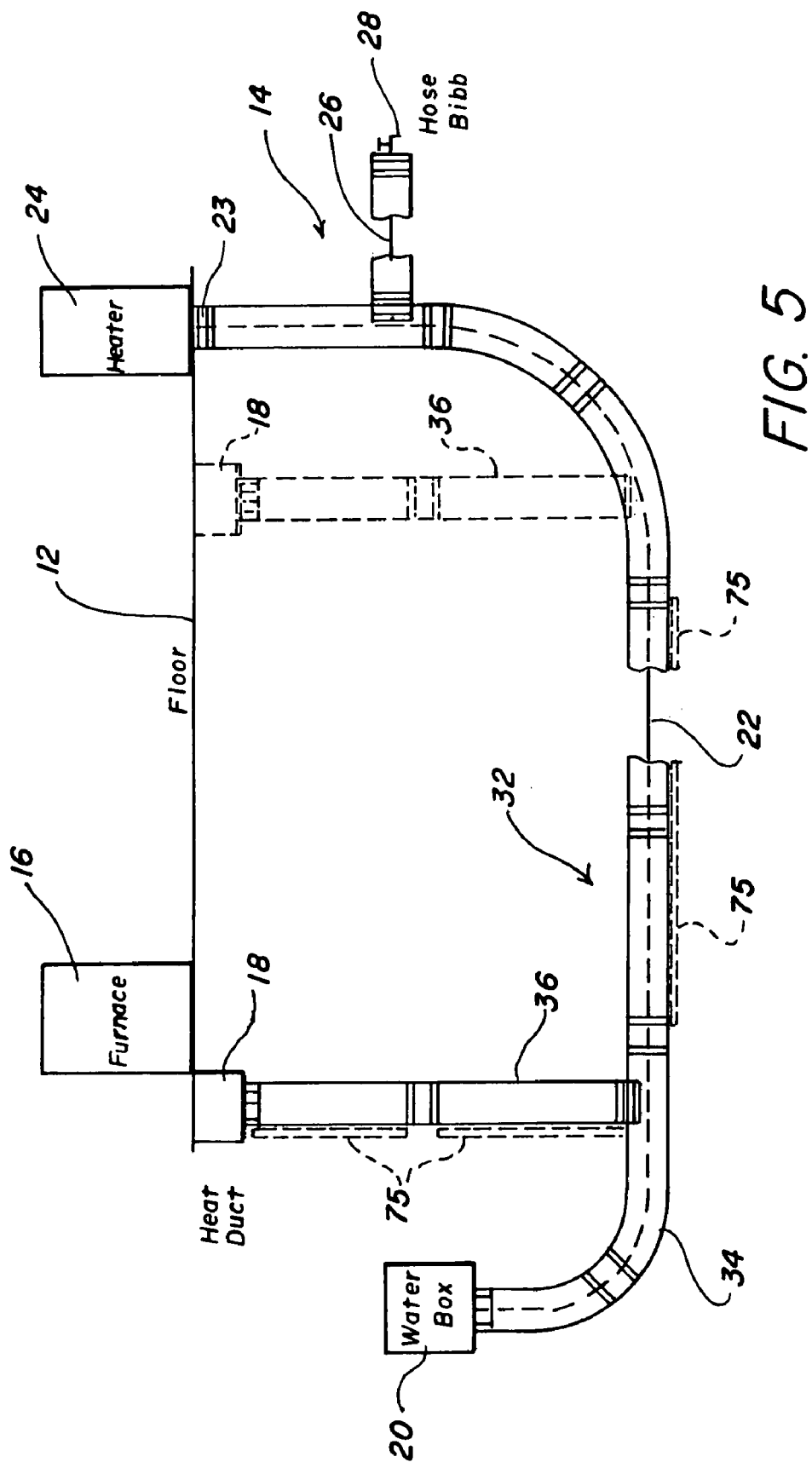
FIG. 5 is a partial cross-sectional view of the device of the invention, in schematic, taken along the plane 5—5 of FIG. 1.

Water is supplied to mobile home 10 from an external water box 20 through a pipe 22, shown in phantom in FIG. 1 and schematically in FIG. 5. Pipe 22 connects to the internal hot and cold water system (not shown) in mobile home 10 at an external water inlet 23 which is usually located near water heater 24, as shown. It will be appreciated that additional water service pipes, such as a service pipe 26 to a hose bibb 28 shown in FIG. 5, are typically included in mobile home 10 or in other dwellings in which the device of the invention may be used.

As shown in FIG. 2, crawl space 14 of mobile home 10 may have an insulating layer 29 under floor 12 over which a vapor barrier layer 30 is installed. Duct work 18 as shown in the drawings is a conventional duct system using rigid ducts, such as sheet metal ducts. It will be appreciated that other duct systems 18 may be used, including flexible and semi-flexible tubular duct systems known in the art.

Figure 3:
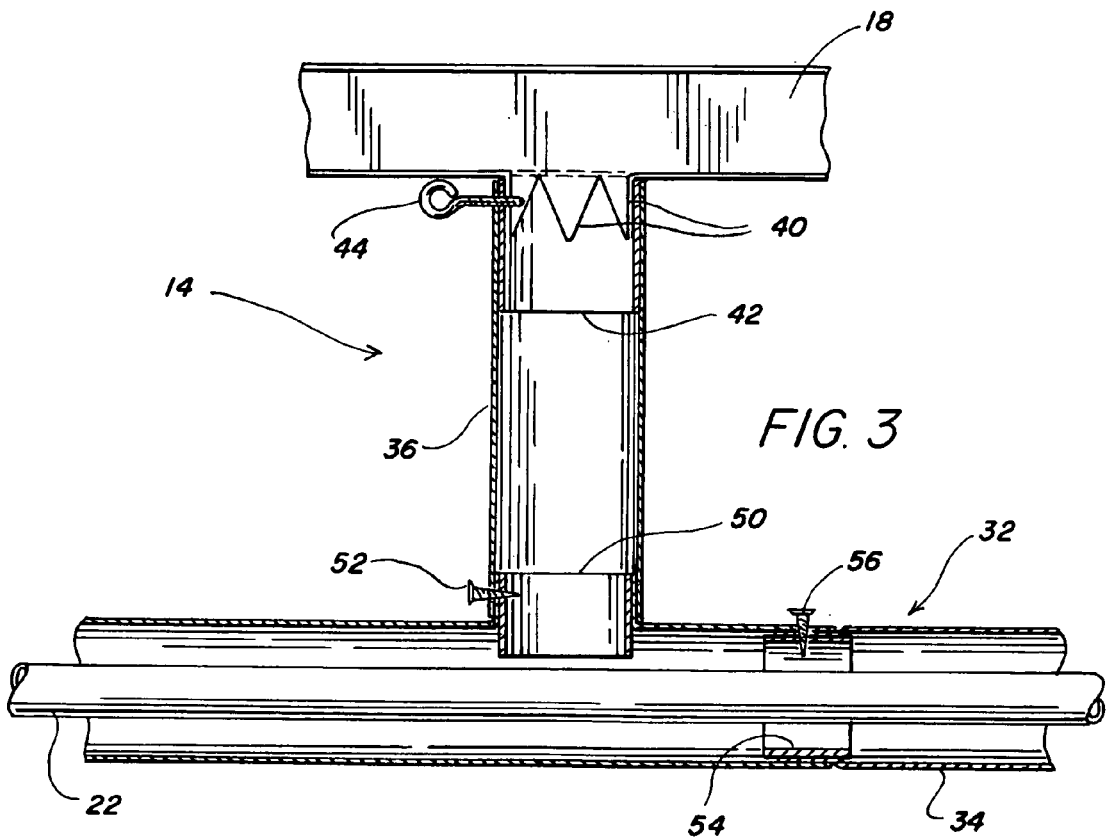
FIG. 3 is a partial cross-sectional view of the device of the invention taken along the plane 3—3 of FIG. 2.
Figure 4:
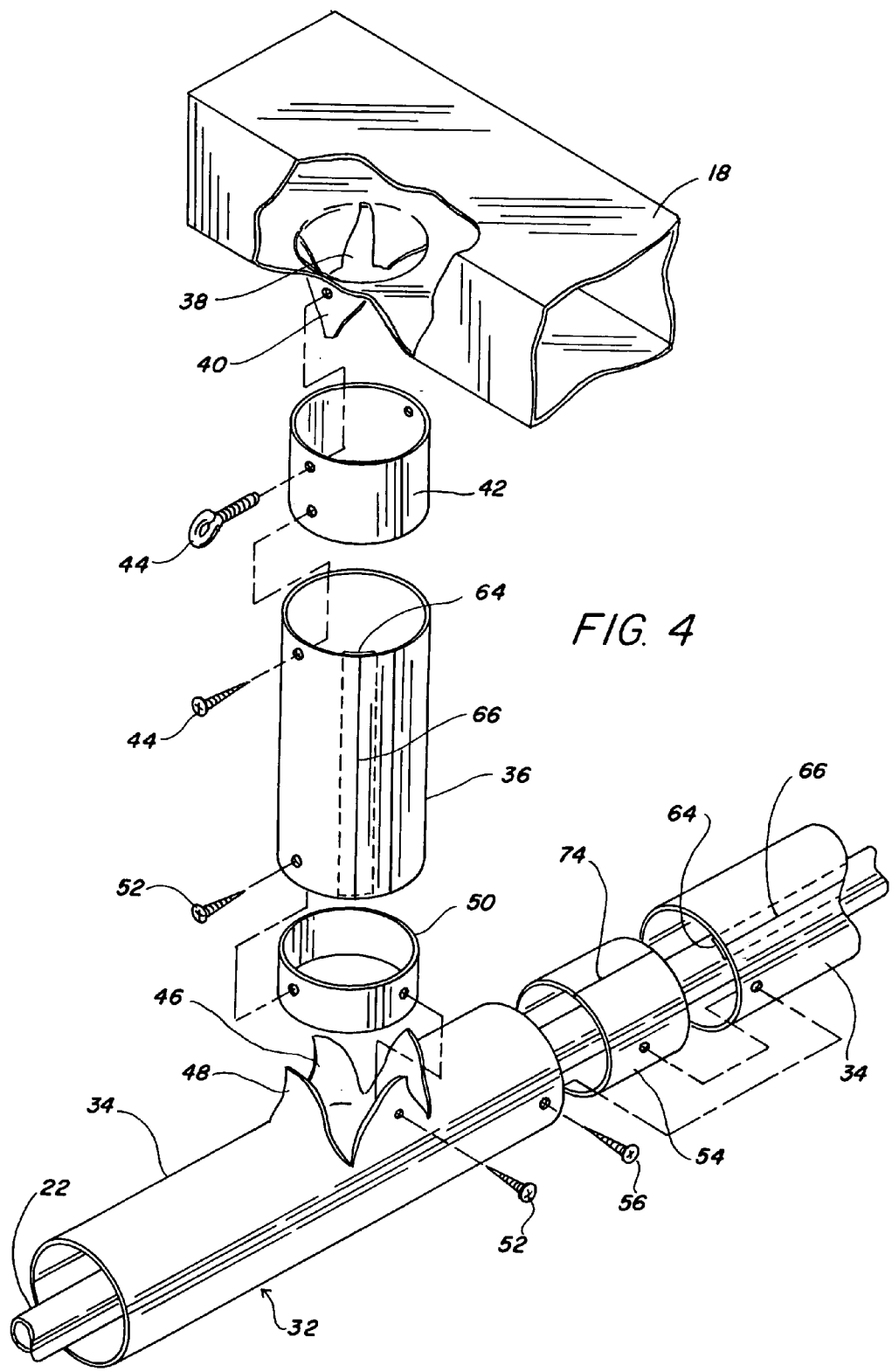
FIG. 4 is a partial, exploded, perspective view of the device of the invention installed on a water pipe in an unheated crawl space, such as under the mobile home of FIG. 1.

Referring to FIGS. 2 through 4, a protective plenum 32 for water pipe 22, and other pipes 26 for mobile home 10, is constructed of thin, flexible plastic tubes 34. Tubes 34 may be seamless, but for some installations it is preferred that they be seamed. In a completed installation tubes 34 are installed around pipes 22 and 26, as shown in FIGS. 2 through 5. Tubes 34 about pipe 22 are connected to hot air duct 18 by a tube 36 which extends upwardly from one of tubes 34. As shown in FIG. 5, tube 34 around pipe 22 may be connected to heat duct 18 by more than one tube 36.

Hot air duct 18 may be joined to tube 36 by cutting slits 38 in hot air duct 18, as shown, and bending down tabs 40. Tabs 40 are arranged in an approximately circular configuration, as shown, and mated with a collar or ring 42. Flexible tube 36 is installed over collar 42 and tabs 40 and joined using suitable fasteners such as screws 44.

Tube 36 is joined to tube 34 by cutting slits 46 in tube 34 and bending up tabs 48. Tabs 48 are arranged in an approximately circular configuration, as shown, and mated with a collar or ring 50. Flexible tube 36 is installed over collar or ring 50 and tabs 48. Flexible tube 36, tabs 48 and collar or ring 50 are joined, as shown, using suitable fasteners such as the screws 52. Depending on the distance between collars or rings 42 and 50, additional, spaced apart collars or rings may be provided for support of flexible tube 36.

Flexible tube 34 is installed over the pipes, such as pipe 22, typically in sections as shown. The sections of flexible tubing 34 are joined by a collar or ring 54 which is mated to the ends of adjacent sections of flexible tubing 34, as shown in FIGS. 3 and 4. The joint of flexible tubing 34 and collar or ring 54 is fixed by suitable fasteners, such as screws 56. Depending on the length of the section, intermediate, spaced apart collars or rings may be provided in flexible tubing 34 for support.

When installed on a system of pipes, such as pipes 22 and 26, and connected to a hot air duct such as duct 18, flexible tubes 34 and 36 form protective plenum 32 for the system of pipes. The pressure of the forced air from furnace 16 inflates flexible tubes 34 and 36 like a low pressure balloon and sections of flexible tubes 34 and 36 may not require additional internal or external collars or rings between the joints. A return duct to the hot air system is not needed. The air leakage from the joints of tubes 34 and 36 permits sufficient air flow through plenum 32 to maintain a hot air barrier around pipes 22 and 26, and other pipes in plenum 32. The heat loss from plenum 32 is negligible and most of the hot air that is lost is leaked into crawl space 14 where it may provide some warming effect to floor 12 of mobile home 10.

As described above, the elements of plenum 32 are joined by screws 44, 52 and 56. It will be appreciated, however, that other conventional fastening methods and devices may be used. For example, nails, rivets, staples, welds, adhesives and tapes may be used.

Plenum 32 may be constructed of tubes 34 and 36 which are seamless tubes formed preferably of a inexpensive, thin, flexible material. Seamless tubes 34 and 36 are easily installed when mobile home 10 is placed on a site. However, for retrofit installation, it may be more convenient to use seamed tubes 34 and 36.

Figure 6:
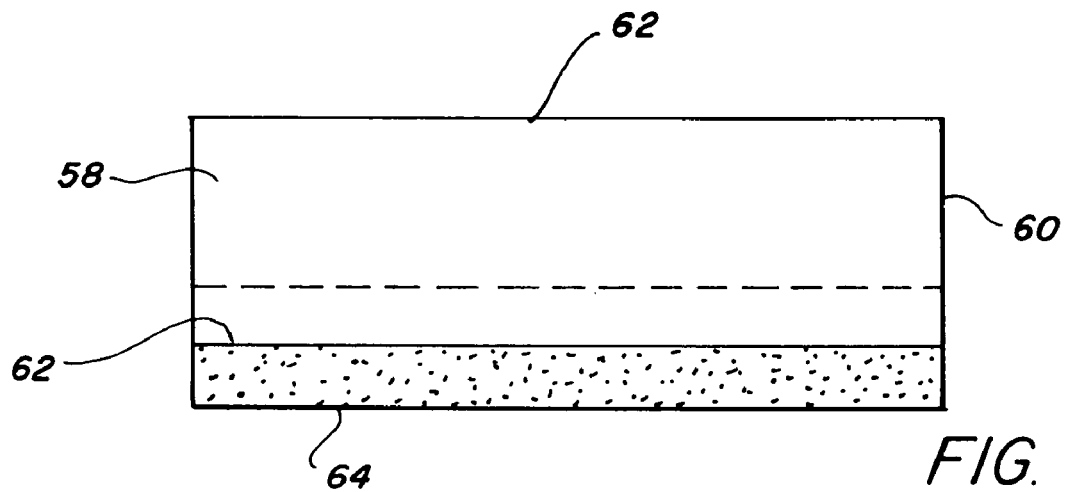
FIG. 6 is a top plan view of a flexible sheet of the invention used to construct the flexible plenum of the invention.
Figure 7:
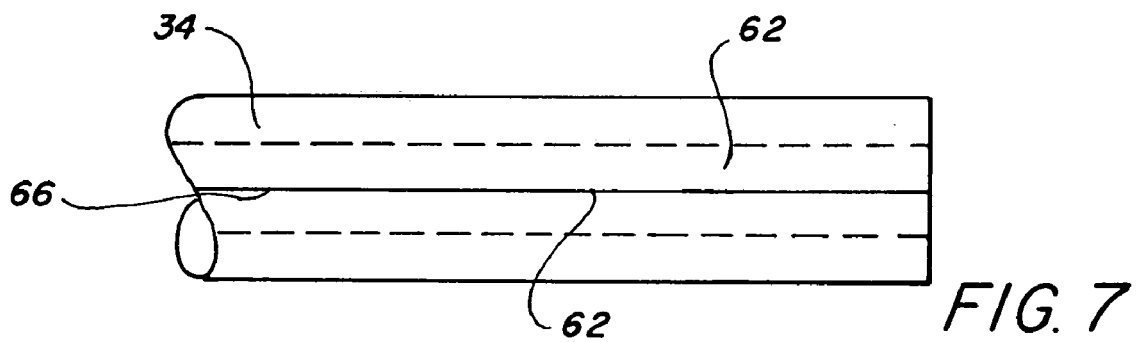
FIG. 7 is a front view of the sheet of FIG. 6 formed into a tubular plenum of the invention; and, FIG. 8 is an alternative embodiment of the flexible sheet of the invention.

Seamed tubes 34 and 36 are also formed of inexpensive, thin, flexible material. The material for tubes 34 and 36 is cut to form sheets 58 which have a short side 60 sized to the circumference of the tubes 34 and 36, for example from about six to fifteen inches, with about twelve inches being preferred. The long sides 62 of tubes 34 and 36 may be joined on site, or where manufactured, using a tape 64, shown in FIG. 6. Tape 64 may be adhesive and installed on sheets 58 at the place of manufacture or installed at the work site. FIG. 7 shows sheet 58 formed into tube 34 with long sides 62 joined into a seam 66 by adhesive tape 64, placed on the inside of tube 34. It will be appreciated that tube 34 may be formed with tape 64 on the outside of tube 34. Hook and pile fasteners such as VELCRO brand fasteners may be used in place of adhesive for tape 64.

Figure 8:
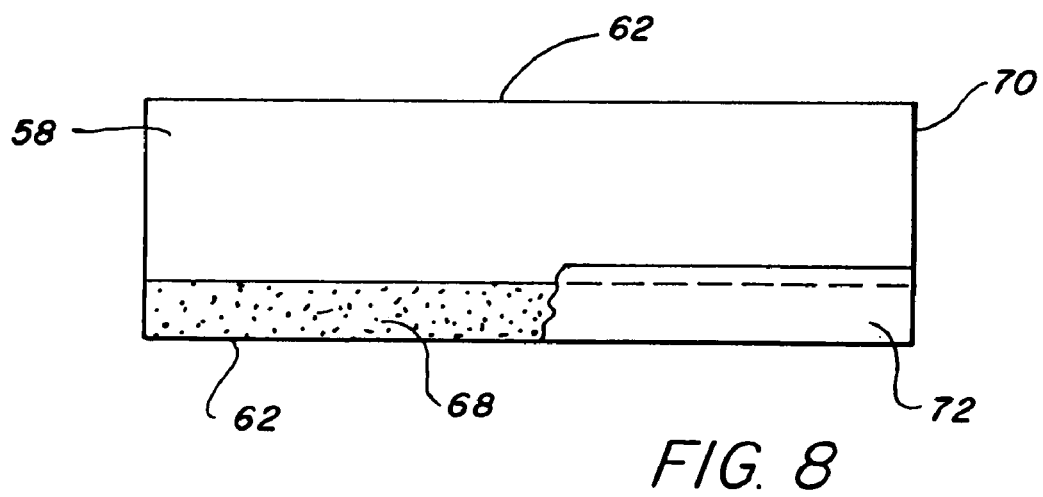

FIG. 8 shows and alternative embodiment of sheet 58. In FIG. 8, sheet 58 has an adhesive layer 68 pre-applied at long side 62, as shown. Short sides 70 of sheet 58 may be lengthened to permit an overlap of long sides 62 to form tube 34 or 36 of the desired circumference. Adhesive layer 68 may be protected until it is used by a strip sheet 72, as may tape 64 of FIGS. 6 and 7 if desired. Sheet 58 of FIG. 8 may be formed into tube 34 or 36 by attaching long side 62 having adhesive layer 68 to its opposite long side 62 to form an overlapped seam.

It will be appreciated that plenum 32 of the invention may be provided to the user in a kit form. This form may be most convenient when plenum 32 is installed as a retrofit to an existing structure, such as mobile home 10. Tubes 34 and 36 may be preformed, but in one preferred embodiment sheets 58 may be provided in standard lengths and cut to size on site. Sheets 58 may be formed into tubes 34 and 36 by wrapping sheets 58 around the existing pipes and joining long sides 62 as described above. This may avoid the need to break the connection in existing water pipes to make the installation. As shown in FIG. 4, rings 54 may be split at 74 and snapped over pipes 22 and 26 by opening split 74 and then releasing it.

It will be appreciated that the plenum of the invention provides a very inexpensive way of protecting pipes from freezing. The materials used are convenient and inexpensive. The sheets and tubes are preferably formed of inexpensive plastic sheet, such as polyethylene, PVC, polypropylene and the like, including fiber reinforced materials. Collars or rings 42, 50 and 54 may be formed of inexpensive metal, such as aluminum, or may be formed of plastic materials, such as polyethylene, polypropylene, PVC, or the like. As shown in FIG. 5, a strap 75 may be provided between collars or rings 42 and 50, between collars or rings 54 and between any intermediate collars. The purpose of strap 75 is to space the collars or rings and to keep the tubes from collapsing. Strap 75 may be made of a flexible material like that used for the collars or rings and is attached to the collars or rings.

It will be appreciated by those skilled in the art that the specific descriptions given herein are illustrative and by way of example. The specific structures disclosed herein may be modified and changed without departing from the spirit of the invention. The invention herein is not to be limited to the specifics of the disclosure, but only by the scope of the appended claims and their equivalents.

What is claimed is:

1. A kit for installing an inflatable protective plenum on pipes subject to freezing, the kit having thin, flexible tubing, the tubing having a circumference greater than the pipes on which it is to be installed, the thin, flexible tubing being in sections, the kit having rigid, joining elements and fasteners to join adjacent sections of the thin, flexible tubing to the rigid, joining elements with air leakage, the kit also including a connecting element to connect the protective plenum to a source of warm air to at least partially inflate the protective plenum and to form a protective barrier of warm air in the protective plenum without a cold air return in the plenum to the source of warm air.

2. The kit of claim 1 wherein the thin, flexible tubing is seamless tubing.

3. The kit of claim 1 wherein the thin, flexible tubing is seamed tubing.

4. The kit of claim 3 wherein the thin, flexible tubing is formed from a sheet of plastic material and the sheet of plastic material has opposed edges, the opposed edges of the sheet of plastic material having attaching structure to attach the edges to each other and form a seamed, thin, flexible tube.

5. The kit of claim 4 wherein the attaching structure includes an adhesive layer on an edge of the sheet of plastic material.

6. The kit of claim 5 wherein the adhesive layer is protected by a stripable film.

7. The kit of claim 4 wherein the attaching structure includes an adhesive tape.

8. The kit of claim 7 wherein the adhesive tape is protected by a stripable film.

9. The kit of claim 4 wherein the attaching structure can be attached in situ around a pipe subject to freezing.

10. The kit of claim 1 wherein the joining elements of the kit include rings for joining adjacent sections of the thin, flexible tubing.

11. The kit of claim 10 wherein the rings are split for snap installation in situ around existing pipe.

12. The kit of claim 1 wherein the connecting element of the kit is a collar for connecting the protective plenum to a hot air duct.

13. The kit of claim 1 wherein the thin, flexible tubing is formed of a plastic film or sheet.

14. The kit of claim 13 wherein the plastic film or sheet is fiber reinforced.

15. A kit for installing an inflatable protective plenum on pipes subject to freezing, the kit having a sheet of thin, flexible plastic film, the sheet of plastic film having a first edge and a second edge thereon, the first edge having an adhesive connector thereon to connect to the second edge and form a thin, flexible seamed tubing from the sheet of plastic film, the thin, flexible tubing having a circumference greater than the pipes on which it is to be installed, the thin, flexible tubing being in sections, the kit having joining rings and fasteners to join adjacent sections of the thin, flexible tubing to the joining rings with air leakage, the joining rings being split for snap installation in situ around existing pipe, the kit also including a connecting collar to connect the protective plenum to a hot air duct to at least partially inflate the protective plenum and to form a protective barrier of warm air in the protective plenum without a cold air return in the plenum to the source of warm air in the hot air duct.

16. The kit of claim 15 wherein the plastic film is fiber reinforced.

17. The kit of claim 15 wherein the adhesive connector is protected by a stripable covering.

18. The kit of claim 15 wherein the adhesive connector is an adhesive tape.

19. The kit of claim 15 wherein the adhesive connector is a layer of adhesive applied to one of the first and second edges of the sheet of plastic film.

* * * * *